Patented July 29, 1941

2,251,092

UNITED STATES PATENT OFFICE 2,251,092

WIRE DRAWING LUBRICANT AND METHOD OF PRODUCING THE SAME

Robert C. Williams, Columbus, Ohio, assignor to The Ironsides Company, Columbus, Ohio, a corporation of Ohio No Drawing. Application January 25, 1938, Serial No. 186,864

10 Claims. (Cl. 252—25)

This invention relates to a novel method of and composition for treating steel rods or wire preparatory to drawing the same through diameter reducing dies, it being an object of the invention to provide such rods or wire with an improved coating prior to drawing the same through the dies, by which metal to metal contact is minimized, the life of the dies prolonged and scoring or galling of the rods or wires prevented.

In the art of wire and rod drawing, it is an accepted practice to apply various soap powders, such as metallic stearates or palmitates to lime-coated rods or wires immediately prior to the passage of the latter through the forming dies. While these lubricants are quite satisfactory for the purposes specified, the present invention provides an equally satisfactory lubricant from an operation standpoint and, in addition, provides a lubricant which may be produced and utilized at lower costs than lubricants of comparable performance which are now in general use.

To this end the invention provides for the provision of a wire drawing lubricant composed of a finely divided dolomitic lime having a fatty acid, preferably stearic acid, substantially adsorbed on the extended surface area of the lime particles, my improved lubricant being of a substantially dry and stable water-repellent nature capable in use of effectively protecting both the rods and the drawing dies and imparting desired finishes to the drawn metal.

In accordance with the present invention, my improved lubricant is produced by dissolving stearic acid in a suitable solvent, dispersing a finely sub-divided lime in the solution, agitating the mixture and removing the solvent by suitable means. The dry product then has the characteristic of being difficultly wet by water, indicating substantially complete surface adsorption of the stearic acid by the lime particles.

Practice has disclosed that a lime coated with stearic acid in accordance with the present invention and used as a steel wire drawing lubricant provides excellent lubrication, with results favorably comparable with those obtained through the use of conventional soap powders, such as aluminum stearate and mixtures of aluminum stearate and lime. An outstanding characteristic of my present lubricant resides in the fact that the stearic acid is firmly retained by the lime particles through substantially complete surface adsorption thereon.

The following comprise analyses showing typical examples of my improved lubricant:

Example 1

| | Parts by weight |
|---|---|
| Stearic acid | 5 |
| Isopropyl alcohol | 80 |
| Finely divided dolomitic lime (hydrated) | 20 |

In compounding the above ingredients forming this example, the stearic acid and the isopropyl alcohol forming the solvent are warmed to approximately 100° F. to dissolve the stearic acid, the lime then being added, and the resulting mixture stirred or otherwise agitated. The solvent may be removed by filtration or by simple evaporation at room temperatures, or may be subjected to mild heating, while the interior of the mixing vessel is retained under sub-atmospheric pressures to accelerate the rate of evaporation of the solvent but without raising the temperature of the stearic acid to cause the same to enter into chemical reaction with the lime present.

Example 2

| | Parts by weight |
|---|---|
| Stearic acid | 10 |
| Isopropyl alcohol | 80 |
| Lime | 20 |

The same procedure may be employed in the compounding of these ingredients as given in Example 1. It will be noted that a greater quantity of stearic acid is present than can be adsorbed by the lime and consequently on filtering off the solvent, or otherwise removing same, after adsorption has taken place, there will probably remain some excess stearic acid in solution, which is capable of being detected by an evaporation test.

Example 3

| | Parts by weight |
|---|---|
| Stearic acid | 10 |
| Isopropyl alcohol | 200 |
| Lime | 40 |

Example 4

| | Parts by weight |
|---|---|
| Stearic acid | 10 |
| Isopropyl alcohol | 100 |
| Lime | 40 |

While I have disclosed certain preferred examples of my improved lubricant, it will be understood that the proportions and ingredients may be considerably varied and modified without departing from the essential features of the invention. For instance, in lieu of using isopropyl alcohol, a relatively cheap commercial solvent, I may substitute therefor other solvents such as low boiling petroleum oils, naphtha, acetone, or toluene. A peculiarity of acetone is the relatively small quantity thereof which may be employed in obtaining adsorption of the stearic acid on the surfaces of the lime particles as shown by the following analysis:

*Example 5*

| | Parts by weight |
|---|---|
| Stearic acid | 10 |
| Acetone | 20 |
| Lime | 40 |

Fatty acids, other than stearic acid, may also be used in producing the lubricant comprising the present invention. For instance, I may employ fatty acids obtained from hydrogenated fish oil or in other instances, may use palmitic or oleic acid. Oelic acid tends to produce a somewhat more moist compound than the other fatty acids of this group.

Any accepted practice may be used in the preliminary treatment of the wire and rods before the latter are coated with the lubricant or lubricants forming the present invention. Thus the work pieces may be thoroughly cleaned by immersing the same in the customary acid pickling bath for a suitable period of time to remove scale and foreign matter from the surfaces thereof, after which the work pieces are washed with water. The work pieces may then be dipped in a bath containing 2% to 12% of lime in water and subsequently dried, either with or without the use of elevated temperatures.

Following these preliminary treatments, the rods or wire, forming such work pieces, are advanced through a container in which my improved lubricant is disposed, in order that the exterior surfaces of said work pieces will be coated with lubricant at the time the same enter the drawing dies. My lubricant thoroughly protects the dies and the metal pieces passed therethrough from scoring or galling and produces a hard smooth finish on the drawn metal characteristic of the more expensive lubricants now adapted for this purpose.

In Examples 1, 3 and 4 above given, apparently complete adsorption of the fatty acid on the surfaces of the lime particles takes place. The critical factor for complete adsorption with isopropyl alcohol as the solvent is not the ratio of the solvent to the lime or stearic acid but more particularly the ratio of lime to stearic acid. Naturally, the finer the state of subdivision of the lime particles, the greater will be the surface area exposed for adsorption, and when the ratio between the lime and stearic acid is considered, the particle size of the lime is of increased importance. The purposes of the present invention are accomplished when the amount of the solvent used is sufficient to dissolve the stearic acid and thoroughly wet the lime. Experiments and practical tests indicate that four parts of lime will adsorb one part of stearic acid with the use of solvents comprising isopropyl alcohol or naphtha. Thus as in Example 2, when two parts of lime are used to one part of stearic acid, an excess of stearic acid results.

The dolomitic lime described in Example 1, which I have found to be quite satisfactory in producing the lubricants forming the present invention, is obtained from deposits found in northwestern Ohio, and such limes are characterized by their high magnesium content. An analysis of a typical sample of such lime shows the same to contain 32% of magnesium oxide, 65% of calcium hydroxide and the balance incidental impurities. It will be appreciated, however, that many other types of lime which are lower in magnesium and higher in calcium content may be used. For instance, I have employed a lime containing 7½% magnesium oxide with the balance being calcium hydroxide except for minor percentages of incidental impurities.

What is claimed is:

1. The method of drawing wire, rods and the like, which comprises coating the stock with lime, and then drawing the stock through a suitable dye, with a substantially dry, water-repellent lubricant comprising finely subdivided hydrated lime having a higher fatty acid in substantially complete adsorption on the surfaces of the individual lime particles.

2. In the manufacture of wire, rods and the like, the steps consisting of cleaning stock to remove foreign matter, and then drawing the stock through a suitable die with a substantially dry, water-repellent lubricant comprising finely divided hydrated lime having a higher fatty acid substantially completely adsorbed on the surfaces of the individual lime particles.

3. In the art of making wire, rods and the like, the steps which comprise cleaning the stock to remove foreign matter, and then drawing the stock through a suitable die, with a substantially dry, water-repellent lubricant comprising reduced finely divided hydrated lime having stearic acid substantially completely adsorbed on the surfaces of the individual lime particles.

4. A wire or rod drawing lubricant comprising a substantially dry, water-repellent mixture of finely divided hydrated lime and a higher fatty acid, the latter being substantially completely adsorbed over the full surface area of the lime particles, the ratio of lime to fatty acid being at least two to one.

5. A wire or rod drawing substantially dry, water-repellent lubricant comprising a finely subdivided hydrated lime having a higher fatty acid adsorbed over the full surface area of the lime particles.

6. The method of producing a wire drawing lubricant which comprises dissolving a higher fatty acid in a low boiling organic solvent, dispersing finely subdivided lime in the solution of the fatty acid in said solvent, agitating the mixture, and removing the solvent therefrom.

7. The method of producing a wire drawing lubricant comprising adding stearic acid to a low boiling organic solvent, warming the resulting mixture to a temperature of the order of 100° F. to dissolve the stearic acid in said solvent, dispersing finely subdivided lime in the solution to effect adsorption of the stearic acid by the lime particles, and removing the solvent.

8. The method of producing a wire drawing lubricant which comprises dissolving stearic acid in an organic solvent, dispersing finely subdivided hydrated lime in the solution by agitation, approximately four parts by weight of lime being added to the solution to each part of stearic acid, whereby to effect substantially complete surface adsorption of the stearic acid by the lime particles, and following such adsorption, effecting the removal of the solvent.

9. A wire or rod drawing substantially dry, water-repellent lubricant comprising a finely subdivided hydrated dolomitic lime and a higher fatty acid completely joined in surface adsorption with the individual finely divided particles of the lime.

10. A wire or rod drawing substantially dry, water-repellent lubricant comprising a finely divided hydrated dolomitic lime having stearic acid completely joined in surface adsorption with the individual particles thereof.

ROBERT C. WILLIAMS.